July 24, 1951
C. W. KLUG
2,561,802
APPARATUS FOR DETECTION OF TOXIC GASES,
ESPECIALLY CARBON MONOXIDE
Filed July 15, 1948
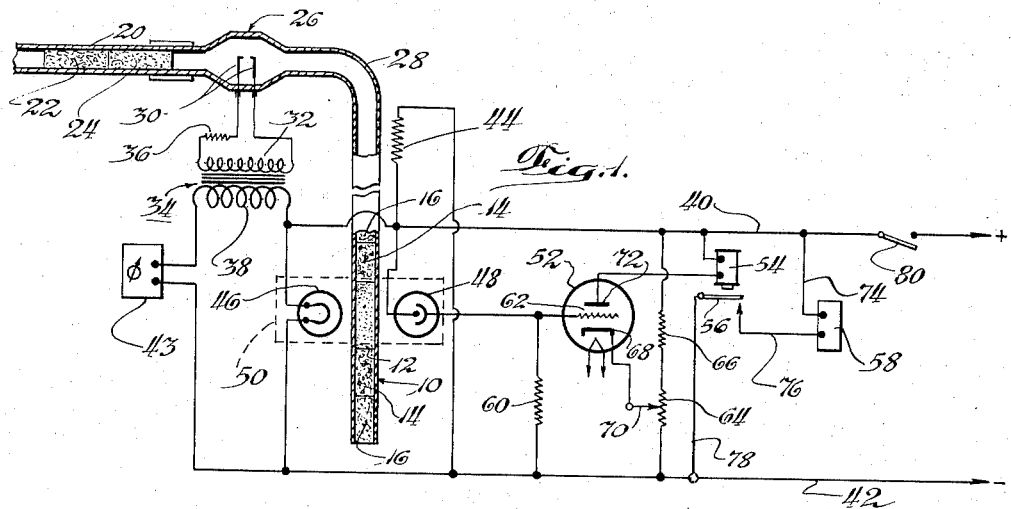
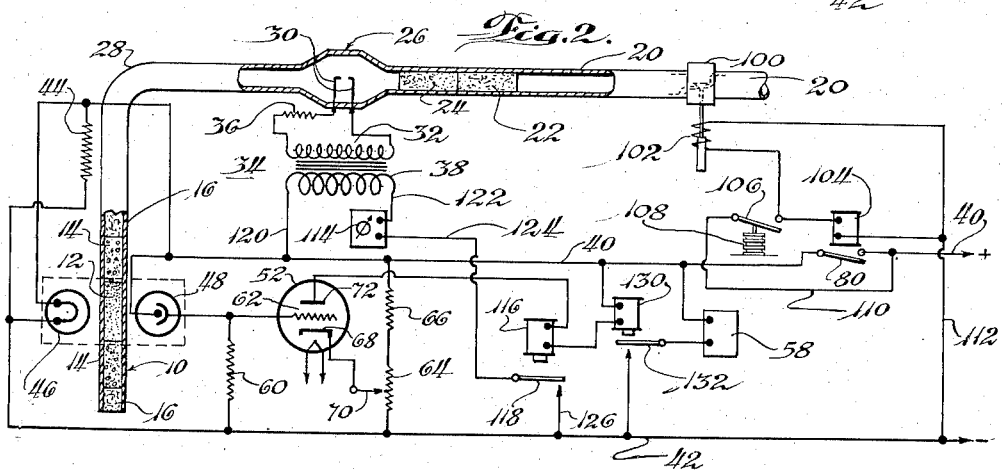
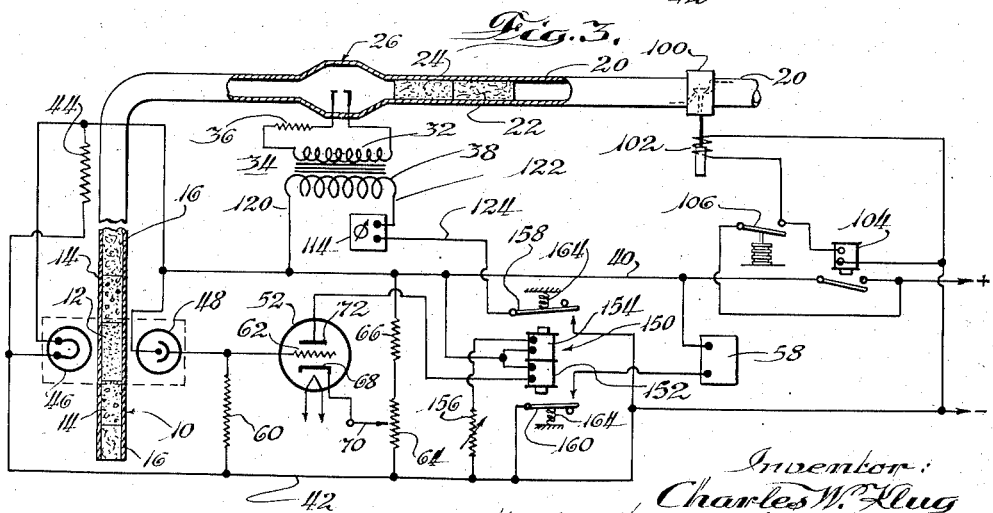
Inventor:
Charles W. Klug
By Hinkle, Horton, Ahlberg & Kupper
Attorneys

Patented July 24, 1951

2,561,802

UNITED STATES PATENT OFFICE 2,561,802

APPARATUS FOR DETECTION OF TOXIC GASES, ESPECIALLY CARBON MONOXIDE

Charles W. Klug, Chicago, Ill., assignor to Stewart-Warner Corporation, Chicago, Ill., a corporation of Virginia Application July 15, 1948, Serial No. 38,816

4 Claims. (Cl. 23—255)

The present invention relates to improvements in methods and apparatus for the detection of toxic gases, and especially carbon monoxide in the heated air supplied to the interior of an airplane from a heater of the exhaust gas type.

This application is a continuation-in-part of the prior application, Serial No. 481,426, filed April 1, 1943, now abandoned.

In the copending application of Willard H. Farr, William F. Fagen and Stanley Kolanowski, application Serial No. 478,324, filed March 6, 1943, since abandoned and the copending continuation-in-part application based thereon, Serial No. 54,802, filed October 15, 1948, now Patent No. 2,553,179, there is described and claimed photosensitive apparatus for detecting the presence of toxic gases, particularly carbon monoxide. This apparatus involves the use of a substance having a photocharacteristic that changes in the presence of carbon monoxide. In its preferred form the apparatus includes a pair of glass tubes, in which the substance is placed and through one of which fresh air is passed and is used as a standard, and through the other of which the air to be tested for the presence of carbon monoxide is passed. Associated with the tubes is a pair of photosensitive devices connected in a balanced differential circuit in such manner that when carbon monoxide is present the circuit is unbalanced and a suitable control or signal device is operated.

The substance which is sensitive to the presence of carbon monoxide is one known as the "National Bureau of Standards colorimetric carbon monoxide indicating gel." The chemical description and method of making this gel are fully disclosed in an article under the title of "Rapid Determination of Small Amounts of Carbon Monoxide (Preliminary Report on the NBS Colorimetric Indicating Gel)" by Martin Shepherd. This article appeared in "Industrial and Engineering Chemistry" (Analytical Chemistry), volume 19, page 77, February 1947. This gel is yellow in color until exposed to carbon monoxide when its color changes from yellow progressively toward a dark blue-green. Thus, in the apparatus of the previously mentioned application, if carbon monoxide is present in the air to be tested, the substance in one of the two glass tubes changes progressively from a yellow to a dark blue-green color, thereby decreasing the amount of light impinging upon the photosensitive device associated with that tube. As already indicated, this results in the unbalance of a bridge circuit, and the unbalance is utilized to operate a signal or controlled device.

It has been found in practice that the substance, which is very sensitive, has a tendency to change color because of the presence of very slight concentrations of carbon monoxide and perhaps other gases having a tendency to discolor it. Efforts have been made to overcome this tendency to discolor by contacting the material with ozone. The ozone may be passed in contact with the substance during the detection of carbon monoxide so that the warning signal or controlled device is operated only when carbon monoxide is present in concentrations above a predetermined value. Ozone may also be passed in contact with the sensitive substance to maintain it in a condition to indicate the presence of carbon monoxide or to restore it to a carbon monoxide indicating condition after it has been spent in the indication of carbon monoxide. Various methods and apparatus for the aforementioned purposes are disclosed and claimed in the copending application of Willard H. Farr, William F. Fagen and Frank A. Fanta, Jr., Serial No. 479,710, filed March 19, 1943, now abandoned, and the copending continuation-in-part application based thereon, Serial No. 59,702, filed November 12, 1948.

A primary object of the present invention is to provide improved methods and apparatus for restoring the carbon monoxide sensitive substance to a carbon monoxide indicating condition after its color has been changed as a result of being exposed to carbon monoxide.

Another primary object of the present invention resides in the provision of new and improved methods and apparatus for maintaining the sensitive substance in a carbon monoxide indicating condition, whereby it may be utilized to indicate carbon monoxide in concentrations above a certain value.

A further primary object of the present invention resides in the provision of new and improved methods of and apparatus for detecting the presence of carbon monoxide and other toxic gases.

The methods of the present invention involve maintenance of the sensitive substance in a heated condition and the use of oxides of nitrogen. It is preferred that the oxides of nitrogen be generated by spark discharge in air and then removing all ozone from the resulting mixture of air, ozone and oxides of nitrogen, preferably by heating the mixture to a temperature above that at which ozone is capable of existing. In other words, in the practice of my invention I heat the sensitive substance and expose it to the restorative action of the oxides of nitrogen, and preferably to oxides of nitrogen obtained in a certain manner.

In the practice of my invention I have produced the oxides of nitrogen by spark discharge in air—an operation I believe produces all the oxides of nitrogen. At the present time I am not certain which of the oxides of nitrogen are the most beneficial in so far as the restorative action is concerned, but it does appear that none of the oxides of nitrogen is harmful. In any event, when the oxides of nitrogen are produced as indicated and the ozone removed from the mixture of air, ozone and oxides of nitrogen, and the resulting mixture passed by the heated sensitive substance, the latter is restored to its original sensitive condition if it has previously been spent, or maintained in condition to indicate carbon monoxide concentrations above a value determined by the concentration of the oxides and the length of time that it is exposed thereto.

It is therefore a further object of the present invention to provide a method of restoring the sensitive indicating gel to a carbon monoxide indicating condition, a method of maintaining it in condition to indicate the presence of carbon monoxide, and a method of detecting the presence of carbon monoxide which includes the steps of maintaining the indicating gel in a heated condition and contacting it with the oxides of nitrogen.

A further object of the present invention resides in the provision of new and approved apparatus for carrying out the methods of the invention.

Other objects and advantages of the present invention will become apparent from the ensuing description, in the course of which reference is had to the accompanying drawing, in which:

Fig. 1 is a diagrammatic representation of one embodiment of the present invention;

Fig. 2 is a view similar to Fig. 1, of a second embodiment of the invention; and Fig. 3 is a view similar to the first two figures of a third embodiment of the invention, which embodiment is, in many respects, similar to that of Fig. 2.

Before considering the details of the physical construction of and the electrical circuits embodied in the apparatus of the invention, it may be well to consider these generally. In brief, the apparatus of the present invention utilizes a single photosensitive device upon which impinges light from a single light source, between which and the device is located a transparent tube containing the sensitive substance and through which the light passes. This sensitive substance, as already indicated, possesses a photocharacteristic—preferably the light transmitting characteristic—which changes in response to the presence of the substance to be tested, which in this case is taken to be carbon monoxide. The air to be tested is passed through the tube, and should this air contain carbon monoxide, the color of the sensitive substance changes from yellow progressively to blue-green. As a result less light is transmitted through the sensitive substance to the photosensitive device. The device is preferably arranged to control the flow of current through an electron tube in such manner that a warning device or some other controlled device in the output circuit of the tube, is operated in response to a predetermined change in the color of the sensitive substance.

In the embodiment of the invention illustrated in Fig. 1, air from within the airplane cabin, or from the hot air outlet duct of a heater, is continuously passed through a tube containing the sensitive indicating gel. The airplane cabin and heater have not been shown, as these may be of any conventional construction and do not form any part of the present invention. The air flow past the indicating gel may be obtained in any suitable way, as by a vacuum pump or otherwise.

The colorimetric indicating gel is preferably located within the central portion of a transparent glass tube indicated by the reference character 10. The indicating gel is shown by the reference character 12, and it occupies the central portion of the tube. Adjacent the opposite ends of the indicating gel are portions 14 of silica gel, and the opposite ends of the tube are filled with some flow restricting material, such as glass wool 16, which serves primarily to keep the indicating gel and silica gel within the tube.

In the instant case it is assumed that air from within the interior of the cabin is conducted past the indicating gel. The air flows through a conduit 20 having disposed therein drying material which may include a portion 22 of calcium chloride and a portion 24 of silica gel. From the dryer the air flows through a spark discharge apparatus 26 utilized to produce the nitrogen oxides, and thence through a conduit 28 to the tube 10.

The air flowing past the indicating gel is substantially continuously although periodically supplied with oxides of nitrogen by the spark discharge apparatus 26. The apparatus includes a pair of spark electrodes 30 connected to the secondary winding 32 of a transformer 34 through a resistor 36. The primary winding 38 of the transformer is connected across the power supply lines 40 and 42 through an adjustable timing device 43 arranged periodically to energize the primary of the transformer winding to produce periodic sparks within the nitrogen oxide generating apparatus. The particular construction of the timing device 43 is not material. It may be of the thermal type, the motor operated cam type, or the electronic type. In one apparatus that I have used, the number of sparks has been 100 per minute, and in this case the timing apparatus was of the motor operated cam type.

In accordance with another of the features of the present invention, any ozone that is generated by the spark discharge apparatus is removed by heating the mixture of ozone, nitrogen oxides, and air generated by the spark discharge apparatus to a temperature above that at which ozone is capable of existing. The heat may be supplied in any suitable manner, as by a resistance type heater 44 permanently connected across the power lines 40 and 42 and located in proximity to the conduit 28 at a point between the spark discharge apparatus 26 and the tube 10. In practice I have utilized various temperatures to remove ozone, such, for instance, as about 150° C. This temperature is considerably above the temperature at which ozone cannot exist, but I prefer to use a higher temperature than actually necessary in order to make certain that no ozone can contact the indicating gel.

The heated air and oxides of nitrogen are then cooled before they come into contact with the indicating gel. In the illustrated embodiment there is no positive cooling means provided other than the length of the conduit 28. In the usual installation the length of the conduit between the heater and the indicating tube is sufficient to provide for cooling the air and oxides of nitrogen by heat loss to surrounding air. If this cooling is not sufficient, then additional cooling means may be provided.

In accordance with another of the features of the present invention, the sensitive indicating gel 12 within the tube 10 is maintained at an elevated temperature by suitable heating means. In the illustrated embodiment the gel is maintained at a temperature in the region of about between 45° to 60° C., and preferably within a closer range of from about 50° to 55° C. This is done by the heat generated by the light source 46, which may be located within some suitable housing, as diagrammatically indicated by the dotted lines 50. If desired, the lamp and photosensitive device may be housed within a structure along the lines of that disclosed and claimed in the aforementioned copending application of Farr et al., Serial No. 478,324, filed March 6, 1943. However, if the heat generated by the lamp and device is either too great or too small, then thermostatically controlled temperature changing apparatus may be utilized to maintain the indicating gel within the desired temperature range.

It has already been indicated that the temperature at which the indicating gel is maintained is preferably in the range between about 45° to 60° C., and particularly in the region between 50° and 55° C. If the temperature of the indicating gel is permitted to go below about 45° C., it is desensitized when contacted by the mixture of air and nitrogen oxides. If the temperature is permitted to go too high, then there is danger that the sensitive indicating gel will be destroyed entirely by the excessive heating.

The change in the amount of light transmitted through the indicating gel from the lamp to the photosensitive device is utilized to control the conductivity of an electron tube 52 controlling the flow of current through a relay 54. The relay 54 operates a switch 56 controlling the indicating or other controlled device 58 which may be, for instance, apparatus controlling either the operation of the heater or a damper or valve controlling the flow of heated air to the interior of the airplane cabin.

The photosensitive device 48 is preferably a photoelectric cell. It is connected across the power lines 40 and 42 through a relatively high resistance resistor 60 and the junction of the resistor and cathode of the cell is connected to the grid 62 of the electron tube.

The electron tube 52 is biased so that it is normally conductive, and it is so arranged relative to the photoelectric cell and resistor that, as less light impinges upon the cell, less current flows through the tube, until at some predetermined value determined by the initial bias, the relay 54 is released. The bias for the electron tube is supplied by a bias resistor 64 connected across the power supply lines through a bleeder resistor 66 and to the cathode 68 of the tube through an adjustable connection 70. By adjusting the connection 70 it is possible to vary the initial grid bias of the tube and thereby the change in color in the indicating gel required to release relay 54.

The relay 54 is connected across the anode 72 of the electron tube and the positive power supply line 40. The controlled device 58 is connected by conductor 74 to supply line 42, and by conductor 76 to a fixed contact associated with switch 56, and the latter is connected by conductor 78 to the supply line 42. A main power switch 80 is provided to control the supply of power to the apparatus heretofore described.

The apparatus is utilized for the detection of carbon monoxide in concentrations above a certain value. The concentration of nitrogen oxides and the time of operation of the oxide generator are adjusted so that the oxides override or counteract the effect of carbon monoxide in concentrations below that to be indicated. In other words, when the carbon monoxide concentration is below the predetermined value there is no such change in the color of the indicating gel as will decrease the flow of current through the electron tube and relay to a point where the relay is released. On the other hand, when the concentration of carbon monoxide reaches the predetermined value, then the flow of current through the relay is decreased to a point where it is released and the switch 56 closes the circuit through controlled device 58.

To place the apparatus in operation, the switch 80 is closed, thereby to energize the various circuits. The lamp 46 is energized and it generates heat to maintain the indicating gel at a temperature between about 50° and 55° C. The heater 44 is also energized and it raises the temperature of the mixture of air, ozone, and oxides of nitrogen to a temperature of about 150° C. to remove all traces of ozone. At the same time, the spark discharge apparatus is periodically placed into operation under the control of the timer or periodic circuit closer 43.

Under normal conditions, that is, when there is no leakage in the heat exchanger and no carbon monoxide present in the interior of the airplane cabin, the air flowing past the indicating gel contains no considerable amount of carbon monoxide. In any event, the carbon monoxide which may be present due to other causes, such, for instance, as smoking or leakage from the exhaust of other engines or the like, is insufficient to produce any noticeable color change in the indicating gel because of the overriding effect of the oxides of nitrogen. The air is caused to flow past the indicating gel through the chemical dryers 22 and 24, and past the electric spark producing apparatus 26 and the heater 44.

When the carbon monoxide content of the air reaches the desired predetermined value at which the relay is to be operated, then the carbon monoxide effects a sufficient change in color of the gel to decrease the conductivity of the electron tube 52 to a point at which the relay 54 is released and switch 56 is closed to operate the controlled device 58.

Once operated to indicate the presence of carbon monoxide, the device 58 remains operated until the air within the interior of the cabin is cleared of carbon monoxide to a concentration less than the predetermined concentration and the relay 54 operated. Once the concentration has been so decreased, the nitrogen oxides restore the indicating gel to its original color and condition, with the result that the electron tube 52 is rendered more conductive and the relay 54 is energized sufficiently to operate switch 56.

It may be noted, therefore, that in the normal operation of the embodiment of the invention of Fig. 1, three distinct methods are involved. The first of these is the primary method of detection of the presence of the gas; the second is the maintenance of the indicating gel in condition to indicate the presence of the gas; and the third is the restoration of the indicating gel into a condition to indicate the presence of carbon monoxide after its color had been changed in response to the presence of carbon monoxide.

The embodiment of the invention illustrated in Fig. 2 differs from that described above primarily in that the photoelectrical control is so arranged that the nitrogen oxide producing apparatus is not placed into operation until the carbon monoxide concentration reaches some value below that at which the warning device is to be operated, and the controlled device is operated only in the event the nitrogen oxides are unable to maintain the indicating gel at a certain color, thus indicating that the gas is present in a concentration equal to or above the predetermined concentration. In addition, there is included in this embodiment of the invention, means for maintaiing the apparatus out of operation as long as the plane is on the ground.

Referring now to Fig. 2 (in which elements corresponding to those shown in Fig. 1 are indicated by like reference characters), it may be noted that the conduit 20 through which air from within the interior of the cabin is supplied to the apparatus is normally closed by a valve 100 operable by a solenoid 102. In addition, it will be noted that the power switch 80 is normally opened, but in this case is operable by a relay 104.

When the plane is on the ground the solenoid 102 and relay 104 are both de-energized, thereby preventing the flow of air from within the cabin past the indicating gel and disconnecting the apparatus from the source of power. When the airplane leaves the ground the solenoid and relay are energized by a switch 106 operable at a desired altitude by an air pressure responsive sealed bellows 108. When the switch 106 is closed, the solenoid and relay are connected in parallel across the power lines 40 and 42 by a circuit including conductors 110 and 112 connected to the power lines 40 and 42, respectively. Thus, when the plane is off the ground, the valve 100 is opened to permit flow of air through the apparatus, and the switch 80 is closed to energize the electrical portion of the apparatus.

The nitrogen oxide generating apparatus 26 is normally inoperative and its operation is controlled conjointly by a timer 114 and a relay 116 in the plate circuit of the electron tube 52. The relay 116 is normally operated and is adapted to be released when the current flow therethrough and through the electron tube decreases to a value indicative of a concentration of carbon monoxide below the predetermined concentration at which the warning signal or controlled device 58 is to be operated.

When the concentration of carbon monoxide reaches this lower critical value, then the relay 116 releases its associated switch 118 and the latter conditions the oxide generating equipment for operation by the timer 114. The closure of the switch connects the timer and primary winding 33 of the transformer across the power lines through conductors 120, 122, and 124, leading to switch 118 and conductor 126.

In the instant embodiment of the invention, the timer is of a character adapted to place the oxide generating apparatus into operation for a certain definite time interval and to keep it out of operation for another time interval. For instance, these time intervals may be one minute "on" and three minutes "off," i. e., during the "on" period sparking occurs across the electrodes 30, as by interruption of the transformer primary circuit. The nitrogen oxide generating equipment is thus placed into operation for a definite time interval and then kept out of operation for another definite time interval. The result is that if the carbon monoxide concentration causing release of relay 116 is not above the predetermined value at which the controlled device 58 is to be operated, then the time of operation is sufficient to override the effect of the lesser concentration of carbon monoxide. If the concentration of carbon monoxide is at this lower critical value, then the one minute periodic operation of the oxide generating equipment is sufficient to prevent any further change in color of the indicating gel, and the oxide generating equipment remains in operation until the air within the cabin is cleared of carbon monoxide, after which the relay 116 is again operated to open switch 118.

In the event the concentration of carbon monoxide within the cabin increases to the predetermined value at which the controlled device is to be operated, then the restorative effect of the nitrogen oxides is insufficient to prevent further change in color of the indicating gel. This further change in color of the indicating gel decreases further the flow of current through the electron tube, with the result that a second relay 130, also in the plate circuit of tube 52, releases its associated switch 132, to connect the controlled device 58 across the power lines 40 and 42. Thus, the nitrogen oxide generating equipment is placed into operation when carbon monoxide is present in concentrations less than the predetermined concentration (which concentration may be a known toxic concentration), and thereafter remains in operation, and if the concentration of carbon monoxide is such as to overcome the restorative effect of the nitrogen oxides, then the warning signal is operated.

The embodiment of Fig. 3 is similar to that of Fig. 2, except in so far as the relay arrangement is concerned. Here the relay 150 is constituted by a pair of opposed portions 152 and 154, only the former of which is in the plate circuit of the electron tube 52. The portion 154 is connected across the power lines 40 and 42 through a resistor 156 adjusted so that at normal condition, i. e., when there is no carbon monoxide present, the current flow through relay section 154 is equal to the current flow through relay 152.

Under normal conditions, the two coil sections oppose each other with equal forces so that a pair of switches 158 and 160 associated with the relay are normally open. The switches are so biased by springs 164 that as the flow of current through the electron tube and portion 152 of the relay decreases in response to discoloration of the indicating gel, the switch 158 is first closed by the force exerted thereon by relay portion 154 and then upon a further decrease in current the switch 160 is closed. Closure of switch 158 places the nitrogen oxide generating apparatus 26 into operation, as described above in conjunction with Fig. 2, while closure of switch 160 operates the controlled device 58.

It is believed that further disclosure of the operation of the embodiment of Fig. 3 is unnecessary, except that it might be pointed out that here again the oxide generating equipment is placed into operation when carbon monoxide is present at a critical concentration below the predetermined or toxic concentration, and that it remains in operation until the carbon monoxide concentration falls, but is maintained in operation should the carbon monoxide concentration rise to the predetermined concentration at which the controlled device is operated.

The methods of restoring and maintaining the indicating gel in condition to indicate may be practiced apart from the method of detection. For instance, tubes containing the sensitive substance may be maintained in condition to be ready to indicate the presence of carbon monoxide by maintaining them in a heated condition and exposing them to the oxides of nitrogen. The tubes may likewise be utilized for visual observation of the presence of carbon monoxide and after they have been spent by indication of carbon monoxide, they may be returned to their original condition. This return or restoration may be effected by heating the tubes and exposing the gel to the action of the nitrogen oxides in the manner heretofore described. After being thus restored, the tubes may be transported and used wherever desired for the purpose of providing visual indication of the presence of carbon monoxide.

From the foregoing detailed description of the present invention, it should be noted that its principles may be applied in various ways. It should be understood, therefore, that the details of the various embodiments are not intended to be limitative of the invention except in so far as set forth in the accompanying claims.

Having thus described my invention, what I claim as new and useful and desire to secure by Letters Patent of the United States is:

1. An apparatus for detecting the presence of a gas constituent in a gaseous medium by the use of a substance in gas permeable form, which undergoes a photocharacteristic change in the presence of said constituent, said apparatus comprising: a light transmitting container constructed to support said substance for passage of gas therethrough, a conduit connected to said container for conducting the medium to be tested to said container, a restoring gas generator in said conduit to generate a restoring gas when energized, a lamp and a photoelectric cell arranged to receive light from the lamp through the container, and means operated by said photoelectric cell for energizing said generator when the light received by said cell drops to a predetermined level and a controlled device operated by said photoelectric cell when the light received by said photoelectric cell drops to a second predetermined level lower than the first said level.

2. An apparatus for detecting the presence of a gas constituent in a gaseous medium by the use of a substance in gas permeable form, which undergoes a photocharacteristic change in the presence of said constituent, said apparatus comprising: a light transmitting container constructed to support said substance for passage of gas therethrough, a conduit connected to said container for conducting the medium to be tested to said container, a restoring gas generator in said conduit to generate a restoring gas when energized, a lamp and a photoelectric cell arranged to receive light from the lamp through the container, and means operated by said photoelectric cell for energizing said generator when the light received by said cell drops to a predetermined level.

3. An apparatus for detecting the presence of a gas constituent in a gaseous medium by the use of a substance in gas permeable form, which undergoes a photocharacteristic change in the presence of said constituent, said apparatus comprising: a light transmitting container constructed to support said substance for passage of gas therethrough, a conduit connected to said container for conducting the medium to be tested to said container, electrodes for producing an electric spark in said conduit when said electrodes are energized, a heater for heating the gas passing through said conduit at a point between said electrodes and said container, a lamp and a photoelectric cell arranged to receive light from the lamp through the container, and means operated by said photoelectric cell for energizing said electrodes when the light received by said cell drops to a predetermined level and a controlled device operated by said photoelectric cell when the light received by said photoelectric cell drops to a second predetermined level lower than the first said level.

4. An apparatus for detecting the presence of a gas constituent in a gaseous medium by the use of a substance in gas permeable form, which undergoes a photocharacteristic change in the presence of said constituent, said apparatus comprising: a light transmitting container constructed to support said substance for passage of gas therethrough, a conduit connected to said container for conducting the medium to be tested to said container, electrodes for producing an electric spark in said conduit when said electrodes are energized, a heater for heating the gas passing through said conduit at a point between said electrodes and said container, a lamp and a photoelectric cell arranged to receive light from the lamp through the container, and means operated by said photoelectric cell for energizing said electrodes when the light received by said cell drops to a predetermined level.

CHARLES W. KLUG.

REFERENCES CITED

The following references are of record in the file of this patent:

UNITED STATES PATENTS

| Number | Name | Date |
| --- | --- | --- |
| 1,919,858 | Pettingill | June 25, 1933 |
| 2,019,871 | Pettingill et al. | Nov. 5, 1935 |
| 2,111,301 | Schroter | Mar. 15, 1938 |
| 2,114,383 | Jacobson | Apr. 19, 1938 |
| 2,234,499 | McAllister | Mar. 11, 1941 |
| 2,295,366 | Stout | Sept. 8, 1942 |
| 2,349,963 | Harrison | May 30, 1944 |